United States Patent [19]

Schmidt

[11] Patent Number: 5,325,459
[45] Date of Patent: Jun. 28, 1994

[54] OPTICAL ATTENUATOR USED WITH OPTICAL FIBERS AND COMPENSATION MEANS

[75] Inventor: Siegmar Schmidt, Wildberg, Fed. Rep. of Germany

[73] Assignee: Hewlett-Packard Company, Palo Alto, Calif.

[21] Appl. No.: 16,583

[22] Filed: Feb. 10, 1993

[30] Foreign Application Priority Data

Feb. 25, 1992 [EP] European Pat. Off. ......... 92103131.6

[51] Int. Cl.$^5$ .............................................. G02B 6/26
[52] U.S. Cl. ...................................... 385/140; 385/15; 385/25; 385/33; 385/36; 385/47
[58] Field of Search ............ 385/15, 18, 25, 31, 385/33, 35, 36, 39, 47, 140

[56] References Cited

U.S. PATENT DOCUMENTS

| | | | |
|---|---|---|---|
| 3,195,405 | 7/1965 | Clark et al. | 385/140 X |
| 4,398,806 | 8/1983 | Bennett et al. | 350/394 |
| 4,484,793 | 11/1984 | Laude | 385/47 |
| 4,591,231 | 5/1986 | Kaiser et al. | 385/140 X |
| 4,925,273 | 5/1990 | Maisenbacher et al. | 350/315 |
| 5,225,942 | 7/1993 | Ikeno et al. | 359/836 |
| 5,226,104 | 6/1993 | Unterleitner et al. | 385/47 |

FOREIGN PATENT DOCUMENTS

| | | | |
|---|---|---|---|
| 0089758 | 9/1983 | European Pat. Off. | 385/140 X |
| 0093692 | 11/1983 | European Pat. Off. | |
| 0097886 | 1/1984 | European Pat. Off. | |
| 3613688 | 10/1987 | Fed. Rep. of Germany | |
| 55-73002 | 6/1980 | Japan | 385/140 X |
| 59-33404 | 2/1984 | Japan | 385/140 X |
| 60-64307 | 4/1985 | Japan | 385/140 X |
| 2074339 | 10/1981 | United Kingdom | |

Primary Examiner—Brian Healy

[57] ABSTRACT

An optical attenuator for attenuating the intensity of a light beam emerging from an optical fiber comprises a wedge-shaped attenuator disk made of an absorbing material and a transparent disk which is also wedge-shaped and fixed to the absorbing disk. For adjusting different attenuations, the attenuator disk together with the transparent disk are rotated around an axis by a motor. By rotating the disk, the thickness of the absorbing material through which the beam passes and thus the attenuation of the beam can be varied continuously. After passage through the attenuator disk, a corner cube reflects the beam back into the direction where it came from, so that it passes a second time through the transparent plate and the attenuator disk. This second passage occurs at a location which is shifted relative to the location of the first passage (in a direction perpendicular to the plane of the paper). The transmitted beam impinges on a prism from which it is directed via a lens into an optical fiber. Due to the twice repeated passage of the light beam through the attenuator disk and the transparent disk, any refractive index related beam deviations are compensated so that the outgoing attenuated light beam can efficiently be coupled into the optical fiber at all angular orientations of the attenuator disk.

20 Claims, 3 Drawing Sheets

OPTICAL ATTENUATOR USED WITH OPTICAL FIBERS AND COMPENSATION MEANS

FIELD OF THE INVENTION

The present invention relates to an optical attenuator for attenuating the intensity of a light beam. Such an attenuator can be used, for example, in fiber optics for adjusting the intensity level of the light transmitted along the fiber.

BACKGROUND OF THE INVENTION

An optical attenuator of the mentioned kind is known from DE-A-3613688. This known attenuator comprises a rotatable filter element which is coated with an attenuation layer the density of which varies with the angle of rotation of the filter element. The attenuation layer usually is a metal coating whose thickness continuously increases along the circumference of the filter element. Different attenuation factors can be adjusted by adjusting different angles of rotation of the filter element. The application of the metal coating on the filter element with the required accuracy involves considerable effort and is time-consuming, thus leading to comparatively high cost of the attenuator. Furthermore, it may come to problems when very high attenuations are desired and when the beam to be attenuated has a very high intensity. In such a case, the attenuation layer has to dissipate a large amount of energy so that it may detach from the filter element.

Another problem encountered with optical attenuators of the mentioned type is that the attenuation is dependent on the polarization of the light beam. Such polarization dependence is caused by anisotropies in the attenuation layer which may be due to the manufacturing process wherein metal is deposited on a substrate and wherein deposited metal particles may be oriented in preferred directions. This effect is particularly disturbing in fiber optics wherein the polarization of the light can already be changed by bending or twisting the fiber which would cause an unwanted change in the attenuation.

SUMMARY OF THE INVENTION

Relative to the above mentioned prior art, the invention according to claim 1 solves the problem to provide an adjustable optical attenuator the attenuation of which is not dependent on the polarization of the light to be attenuated.

According to the invention, the attenuator comprises a wedge-shaped disk made of an absorbing material through which the light beam to be attenuated is transmitted, and means for rotating the attenuator disk around an axis such that the attenuation of the transmitted light beam is different for different angular positions of the attenuator disk.

Different from the attenuators of the prior art wherein the attenuation is achieved by a metal coating of varying optical density, the present invention achieves different attenuation factors by varying the effective thickness of the material through which the light beam passes. Such variation in thickness is achieved by rotating a wedge-shaped disk around an axis so that the path length which the beam travels in the disk and thus the attenuation varies with the angle of rotation. Since the wedge is made of an isotropic material which has no preferred orientations, the attenuator of the invention is insensitive to the polarization of the light beam.

The expression "wedge-shaped disk" as used in connection with the present invention is not limited to disks having triangular cross section but includes disks of other cross sections if only the thickness of the light absorbing material increases along the cross section.

Since the different attenuation factors are adjusted by a rotary motion, different attenuations can be adjusted very quickly. Furthermore, since the attenuator does not require a metal coating, it is inexpensive to manufacture. A further advantage of the invention is that it avoids interference effects which may occur when coherent light such as laser light is to be attenuated. Interference effects mainly arise if coherent light is reflected from an interface and the reflected beam is superimposed on the original beam. Such interference may have the consequence that at certain wavelengths of the incident light there is extinction of the light inside the attenuator so that the linearity of the attenuator is impaired. Since the attenuator disk of the present invention has the shape of a wedge, i.e., since the optical interfaces are inclined relative to each other, interference of incoming and reflected beams is substantially avoided.

Since the front and rear surfaces of the attenuator disk are inclined relative to each other, the direction of the beam transmitted through the wedge deviates slightly from that of the incoming beam. Consequently, when the wedge performs a complete revolution by 360 degrees, the beam leaving the attenuator describes a circle whereby the diameter of the circle depends on the refractive index of the wedge and on the wedge angle. Such a nutation of the outgoing beam is particularly disturbing in fiber optics applications wherein the attenuated beam has to be coupled into an optical fiber. If the circle of nutation is larger than the core diameter of the fiber, it is not possible to couple the attenuated beam into the fiber at all angular orientations of the attenuator. In order to ensure a constant coupling of the attenuated beam at all angular orientations, the invention comprises an optical system which compensates for beam deflections and thus avoids the mentioned nutation.

According to one embodiment of the invention, the mentioned beam deflection is substantially compensated by providing an additional, non-absorbing glass plate which has the same index of refraction as the absorbing wedge and which is mounted to the wedge. The shape of the non-absorbing wedge is complementary to that of the absorbing wedge so that the combined structure of the two wedges forms a rectangular parallelepiped. Since the beam transmitted through this structure meets the same index of refraction everywhere inside the structure and since it intersects the glass/air interfaces perpendicularly upon entering and upon leaving, the beam remains substantially undeflected.

Any remaining deflection due to, for example, slight differences in the refractive indices of the attenuator disk and the compensating transparent plate can be eliminated by providing an additional compensating arrangement. According to a preferred embodiment, this arrangement comprises a retroreflective element such as a corner cube behind the attenuator disk which directs the beam transmitted through the disk back into the direction where it came from so that it passes through the attenuator disk a second time. Due to the backreflection into the same direction with subsequent passage through the attenuator, it is ensured that the attenuated beam is always in the same direction at all angular orientations of the attenuator (parallel to the incident beam). Any beam deflection which is introduced in the first passage through the attenuator disk is compensated with the second passage. Since the attenuated outgoing beam is always in the same direction, irrespective of the angular orientation of the attenuator disk, the coupling of the attenuated beam into an optical fiber (in particular a monomode fiber) can easily be accomplished.

The retroreflective element is preferably a corner cube which has the advantage that it is easy to align and readily available as a standard optical component. The corner cube may be a triple mirror with three mutually orthogonal reflecting faces. Preferably, however, a corner cube prism is used with three totally reflecting prism faces. The prism has the advantage that the reflection is polarization insensitive, thus contributing to the polarization independence of the attenuator of the invention.

In an embodiment of the invention, the attenuation characteristic of each individual attenuator is measured, i.e., the attenuation resulting at various angular positions of the attenuator disk. These data are stored in a memory, for example a programmable read only memory (PROM) and used during the operation of the attenuator for adjusting a desired attenuation. Since the measuring values are derived for each individual attenuator, it is thus possible to compensate for any manufacturing or alignment tolerances of the attenuator.

It is a further advantage of the invention that the attenuation can be continuously tuned over a broad range of attenuations. Unlike in the prior art, no additional step filters for coarse attenuation are required. According to one example of the invention, any desired attenuation value in the range between 0 and 60 dB can be adjusted. An additional advantage of the invention is the high repeatability in the adjustment of a desired attenuation. Another advantage is that the manufacture of the attenuator is simpler than with prior art devices which require the complicated and time-consuming process of applying a metal coating on the filter element.

Subsequently, embodiments of the invention are explained in more detail with reference to the drawings.

BRIEF DESCRIPTION OF THE DRAWINGS

FIG. 1b is a side view of the attenuator of FIG. 1a.

FIG. 2b is a top view of the attenuator disk of FIG. 2a.

DETAILED DESCRIPTION OF THE PREFERRED EMBODIMENTS

Figure 1A:
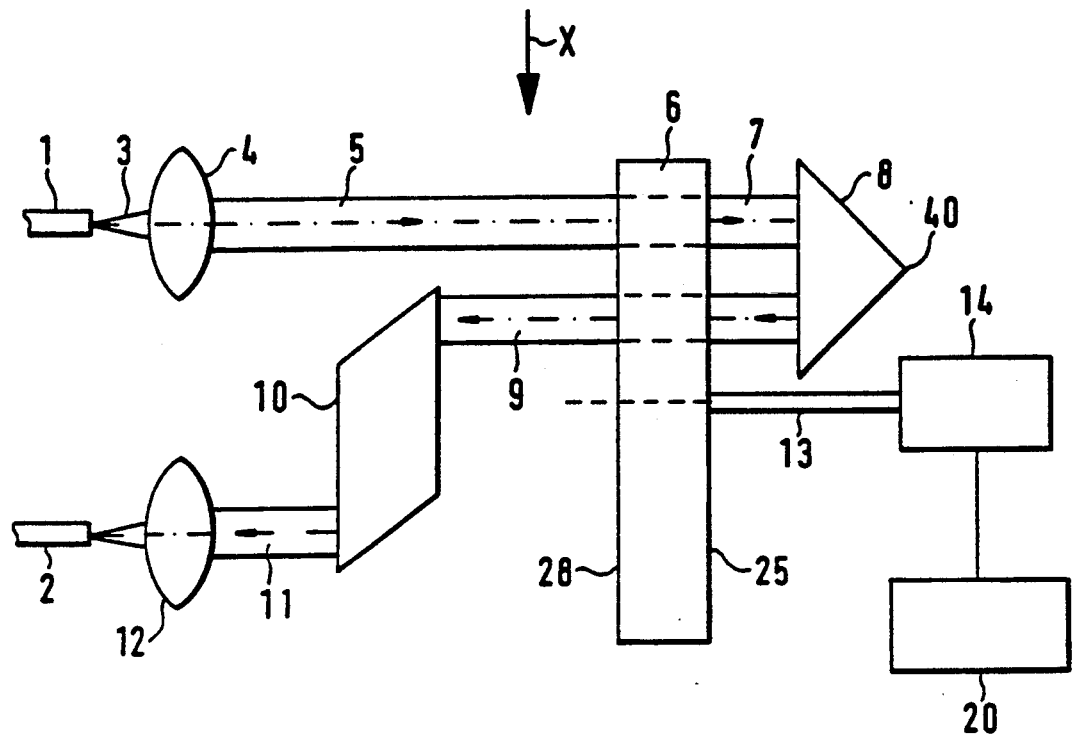
FIG. 1a is a top view of a first embodiment of an attenuator of the invention.

FIG. 1a schematically shows an attenuator of the invention in a top view.

This attenuator can be inserted between two optical fibers 1 and 2. The cone of light 3 leaving the fiber 1 is converted by a lens 4 to a beam of parallel light 5 which impinges on the disk 6. The disk 6 comprises two parts 15 and 16 (see FIG. 1b), which are glued together such that they form a disk having rectangular cross section.

Details of the disk 6 will be described below in connection with FIG. 1b and FIGS. 2a and 2b.

After transmission through the disk 6, the attenuated light beam 7 impinges on a corner cube 8. The corner cube 8 reflects the incident light into the same direction where it came from, but with a parallel offset. Thus, the beam reflected from the corner cube is again transmitted through the disk 6, but at a slightly different position than at the first transmission. The purpose of transmitting the beam two times through the attenuator disk 6 is to compensate for beam deviations caused by refractive index differences and oblique light incidence; further details of this will be explained below.

After the second transmission through the disk 6, the beam 9 impinges on a prism 10 which reflects the beam two times by 90 degrees such that the outgoing beam 11 has a parallel offset relative to the beam 9 leaving the attenuator disk 6. The outgoing beam 11 is then focussed by a lens 12 into the fiber 2. The disk 6 is rotatable around an axis 13 by means of a motor 14 in response to control signals from a control circuitry 20. The adjustment of different attenuation factors is achieved by adjusting different angular orientations of the disk 6.

Figure 1B:
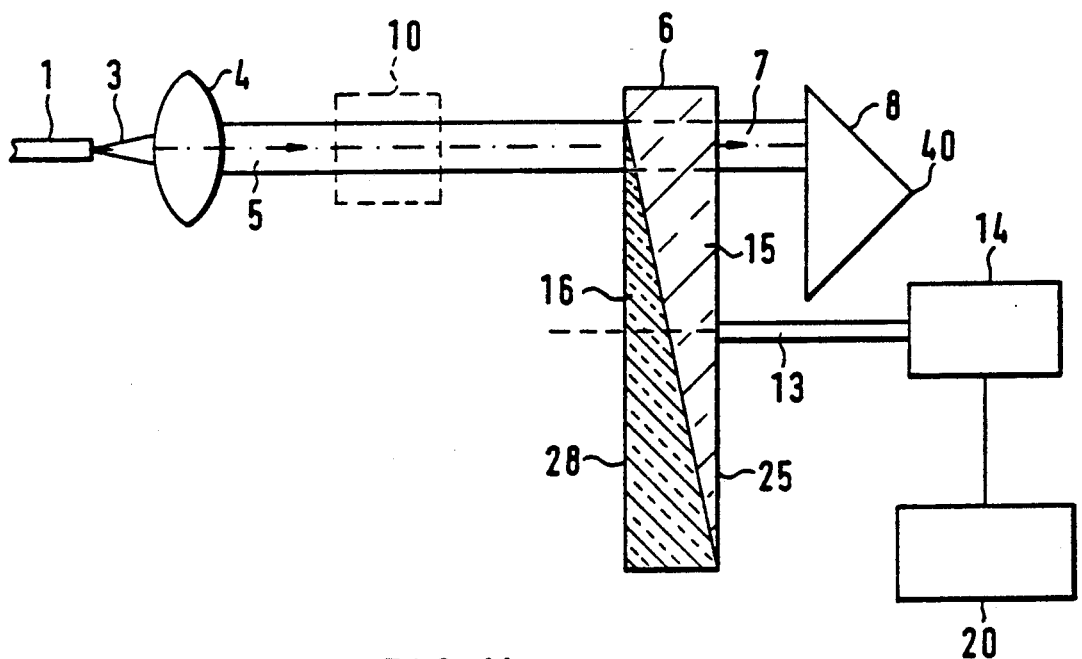

Reference is now made to FIG. 1b which shows the attenuator of FIG. 1a in a side view wherein the disk 6 is depicted in cross section. FIG. 1b corresponds to a view onto the attenuator of FIG. 1a along the direction X indicated in FIG. 1a, or, in other words, FIG. 1b shows the attenuator of FIG. 1a in a perspective which is rotated by 90 degrees with respect to the perspective used in FIG. 1a. Consequently, the lens 12 and the fiber 2 are hidden by the lens 4 and the fiber 1. The prism 10 is depicted in dotted lines since it is arranged below the beam 5. As can be seen from FIG. 1b, the disk 6 comprises a part 16 which is made of a light absorbing material and a part 15 which is substantially transparent for the light impinging on it. The parts 15 and 16 are both wedge-shaped and fixed together such that the resulting disk 6 has a rectangular cross section. The thickness of the wedges 15 and 16 remains constant in a direction perpendicular to the plane of the paper in FIG. 1b. Therefore, the beam 5 impinging on the light-absorbing part 16 from the left and the beam impinging on the part 16 from the right after reflection by the corner cube 8 traverse the same distance within the part 16. In FIG. 1b, the beam reflected by the corner cube 8 towards the disk 6 is hidden by the beam 5. Further details of the attenuator disk will be described with reference to FIGS. 2a and 2b.

Since the thickness of the absorbing part 16 through which the beam 5 passes depends on the angular orientation of the disk 6, the attenuation of the beam 5 can be continuously varied by rotating the disk 6 around the axis 13. The motor 14 is preferably furnished with a position encoder, for example an optical encoder, which indicates the angular position of the attenuator disk.

The control circuitry 20 comprises a programmable read only memory (PROM) which contains data about the angular orientation of the disk 6 corresponding to a desired attenuation. These data are specific for the particular attenuator disk used so that it is possible in that way to compensate for any manufacturing tolerances. Before the first use of the attenuator, a plurality of angular orientations of the disk 6 are adjusted and for each of these angular orientations, the resulting attenuation is measured. The thus obtained data pairs (angle vs. attenuation) are stored in the PROM and used for adjusting desired attenuations. If a desired attenuation lies between two measured values, an interpolation is made to obtain the required angular orientation of the disk 6.

In the following, the disk 6 will be described in more detail with reference to FIGS. 2a and 2b. The disk 6 comprises a substantially non-absorbing part 15, and a light-absorbing part 16. The light absorbing part 16 which is shown in cross section in FIG. 2a has the shape of a wedge. The non-absorbing part 15 which is also generally wedge-shaped, contacts the light-absorbing wedge 16 along the inclined face of the wedge 16. The non-absorbing part 15 has a region 17 at its periphery which projects over the edge of the absorbing part 16. The attenuator is arranged relative to the beam 5 such that the left edge of the beam 5 is located at the left end of the absorbing wedge 16.

Figure 2A:
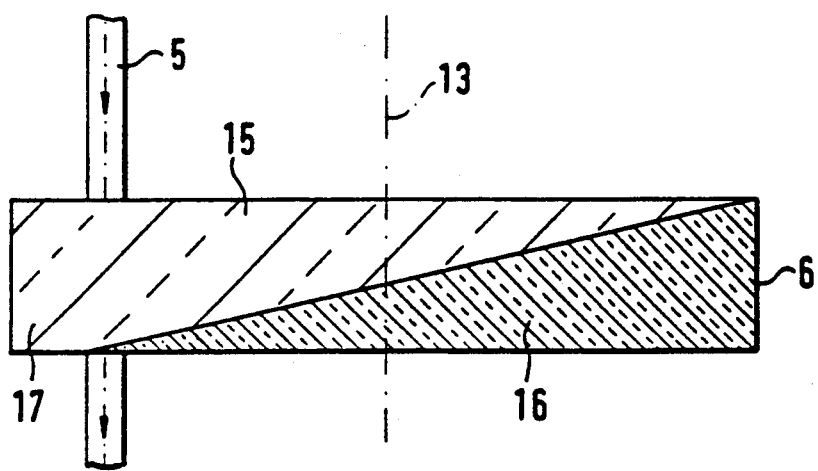
FIG. 2a is a cross section through the attenuator disk shown in FIG. 1b.

At the angular position of the attenuator shown in FIG. 2a, the attenuation of the beam 5 is a minimum. If the disk 6 is turned by 180 degrees around the axis 13, the maximum attenuation of the beam 5 is achieved since the distance which the beam 5 travels through the absorbing material of the wedge 16 is a maximum at this position. Any intermediate attenuation between the minimum and the maximum attenuation can be adjusted by positioning the attenuator at a corresponding angle between 0 and 180 degrees. The attenuation which can be adjusted by adjusting a specific angle of rotation ($\alpha$) is proportional to the term $(1-\cos \alpha)$, wherein $\alpha$=zero corresponds to the angular orientation shown in FIG. 2a. The values for the attenuation in the angular range between 0 and 180 degrees are thus the same as those in the angular range between 180 and 360 degrees.

According to a preferred embodiment of the invention, the motor axis 13 is slightly inclined with respect to the direction of the incoming beam 5. Consequently, the front face 28 of the attenuator disk forms an angle with the beam 5 which differs from 90 degrees. In that way, it is avoided that the beam impinging on the front face 28 can be reflected back into the fiber 1. This ensures a high return loss of the device. A typical value of the angle of inclination of the motor axis 13 relative to the beam axis 5 is 1 degree.

In an embodiment of the invention, the rear face 25 of the non-absorbing wedge 15 has a slight inclination with respect to a line perpendicular to the axis 13 so that the whole disk 6, i.e., the combined structure of the absorbing wedge 16 and the non-absorbing wedge 15, is also slightly wedge-shaped. Consequently, it is avoided that light rays entering the attenuator disk and light rays being reflected from the rear surface of the disk interfere with each other and cause unwanted light modulations. Such modulations would impair the accuracy of the attenuator. This inclination of the rear face relative to the front face for avoiding the mentioned interference effects is mainly used in those embodiments in which the refractive indices of the parts 15 and 16 are completely identical or very close to each other. A typical value of the angle of inclination may be about 5 arc minutes. If the refractive indices of the parts 15 and 16 are sufficiently different, the front and rear surface may be parallel to each other without occurrence of considerable interference effects.

Figure 2B:
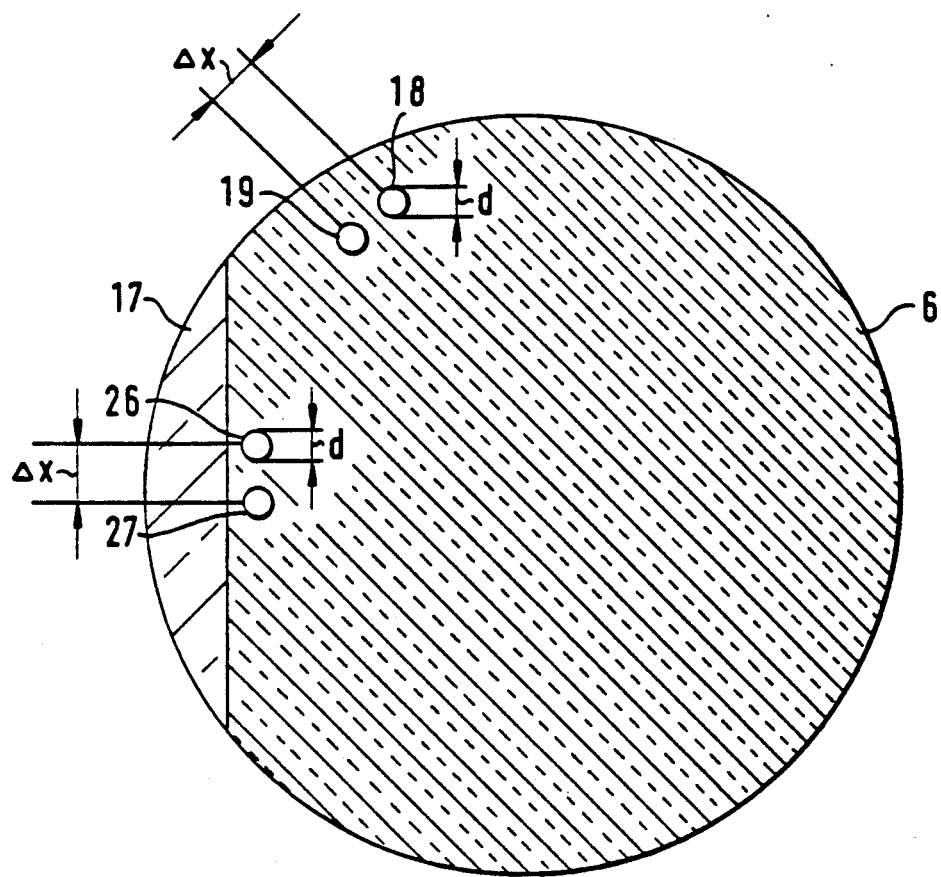

In FIG. 2b is shown a top view of the disk 6. The disk has a circular shape with the axis of rotation 13 passing through the center of the disk 6 perpendicularly to the plane of the paper. The region 17 where the non-absorbing part 15 projects over the absorbing part 16 is a segment of a circle. Reference numeral 26 designates the area where the incoming beam 5 as shown in FIG. 2a impinges on the disk 6 and reference numeral 27 is the area where the beam reflected from the corner cube 8 leaves the disk 6. The shaded area characterizes the absorbing wedge 16. The thickness of the wedge increases from the left to the right. Also shown in FIG. 2b are the locations 18 and 19 of the incoming and outgoing beam, respectively, for a different angular orientation of the disk 6, i.e., after rotating the disk 6 by a certain angle around the axis 13. The diameter of the incoming and outgoing beam is d, respectively. The distance $\Delta x$ between the centers of the two beams depends on the distance between the axis of the incoming beam 5 and the peak 40 of the corner cube 8 (FIG. 1a). This distance is selected such that two times $\Delta x$ is about three times as large as the beam diameter d. With this choice, the incoming and the outgoing beam pass through the absorbing wedge at locations where the thickness of the absorbong wedge 16 is substantially equal so that they are subject to substantially the same attenuation. This does also apply for the other possible locations of the incoming and outgoing beam at other angular orientations of the disk. In the embodiment shown in FIGS. 2a and 2b, the beam to be attenuated does not pass through the non-absorbing region 17 at any angular orientation of the attenuator disk. In an alternative embodiment, however, the beam could also be directed through the region 17 so that actually zero attenuation can be adjusted.

According to an exemplary embodiment of the invention, an attenuator for attenuating light beams in the spectral range between 1.2 to 1.6 micrometers comprises as the attenuating wedge a neutral density glass such as UG 1 (available from the company Schott) which has a substantially uniform attenuation over this spectral range and a transparent glass having substantially the same refractive index and preferably also the same thermal expansion as the attenuator wedge. A possible choice is BK 7, available from the company Schott. The refractive of BK 7 is approximately 1.50 at a wavelength of 1310 nm, and the refractive index of UG 1 is approximately 1.53 at this wavelength. In this exemplary embodiment, the entire disk 6 has a diameter of 50 millimeters, the absorbing wedge 16 has a length of 45 millimeters and a wedge angle of 3 degrees. The attenuation which can be achieved upon a single passage of the light is 30 dB so that the total attenuation is 60 dB.

It is understood that the shape of the wedge of the attenuator disk need not necessarily be triangular in cross section as shown in FIG. 2a. The wedge could, for example, also have a curved cross section, if only the thickness of the light absorbing material shows a monotonic increase along the cross section. In a direction perpendicular to the thickness increase, the thickness remains constant. For better describing the general shape of a wedge in the sense of the present invention, the wedge is considered in a three-dimensional rectangular coordinate system (xyz-system): In such a system, the x-direction corresponds to the direction of increasing thickness of the wedge (corresponding to the horizontal axis in FIG. 2a); the y-direction is perpendicular to the x-direction and is the direction along which the thickness of the wedge remains constant (corresponding to an axis perpendicular to the plane of the paper in FIG. 2a); the z-direction is perpendicular to both the x-and the y-direction (corresponding to the vertical axis in FIG. 2a). The axis of rotation of the wedge thus is along the z-direction.

It is further understood that the absorbing wedge 16 and the non-absorbing wedge 15 do not necessarily have to contact each other, but that there may be an air gap between them.

The corner cube 8 is preferably a triple prism wherein the reflecting surfaces do not have a mirror coating, but wherein the light beams are reflected by total reflection. Total reflection has the advantage that it is not polarization dependent. In order to avoid any potential interference effects of the light in the corner cube, it is furthermore preferred to provide the entrance face of the corner cube with an antireflection coating and to tilt the corner cube slightly such that the entrance face forms an angle with the beam impinging on it which differs from 90 degrees. The tilt angle has to be selected such that the conditions for total reflection still apply. A typical value for the tilt angle is about 1 degree.

Instead of a corner cube prism, a corner cube mirror having three mutually orthogonal reflecting surfaces could also be used. However, such reflecting surfaces (typically metallized surfaces) often have a polarization dependence.

An important feature of the invention is that the direction of the outgoing beam 9 (or 11) remains substantially fixed when the attenuator disk is rotated for the adjustment of different attenuations. In principle, the use of a transparent plate 15 which has a shape complementary to the shape of the absorbing wedge 16 would be sufficient for most applications. In order to achieve a complete compensation of the beam deviation due to the inclination of the surfaces of the wedge 16, however, the refractive index of the compensating plate 15 has to be precisely the same as the refractive index of the wedge 16. If it should occur in practice that the refractive indices are not absolutely equal, the use of a retroreflective element like the corner cube 8 ensures the removal of any remaining beam deviations. This is due to the fact that the corner cube reflects the beam transmitted through the disk 6 back through the disk along the same direction so that any beam deviations introduced by the forward transmission through the disk 6 are compensated by the subsequent backward transmission through the disk.

Figure 3:
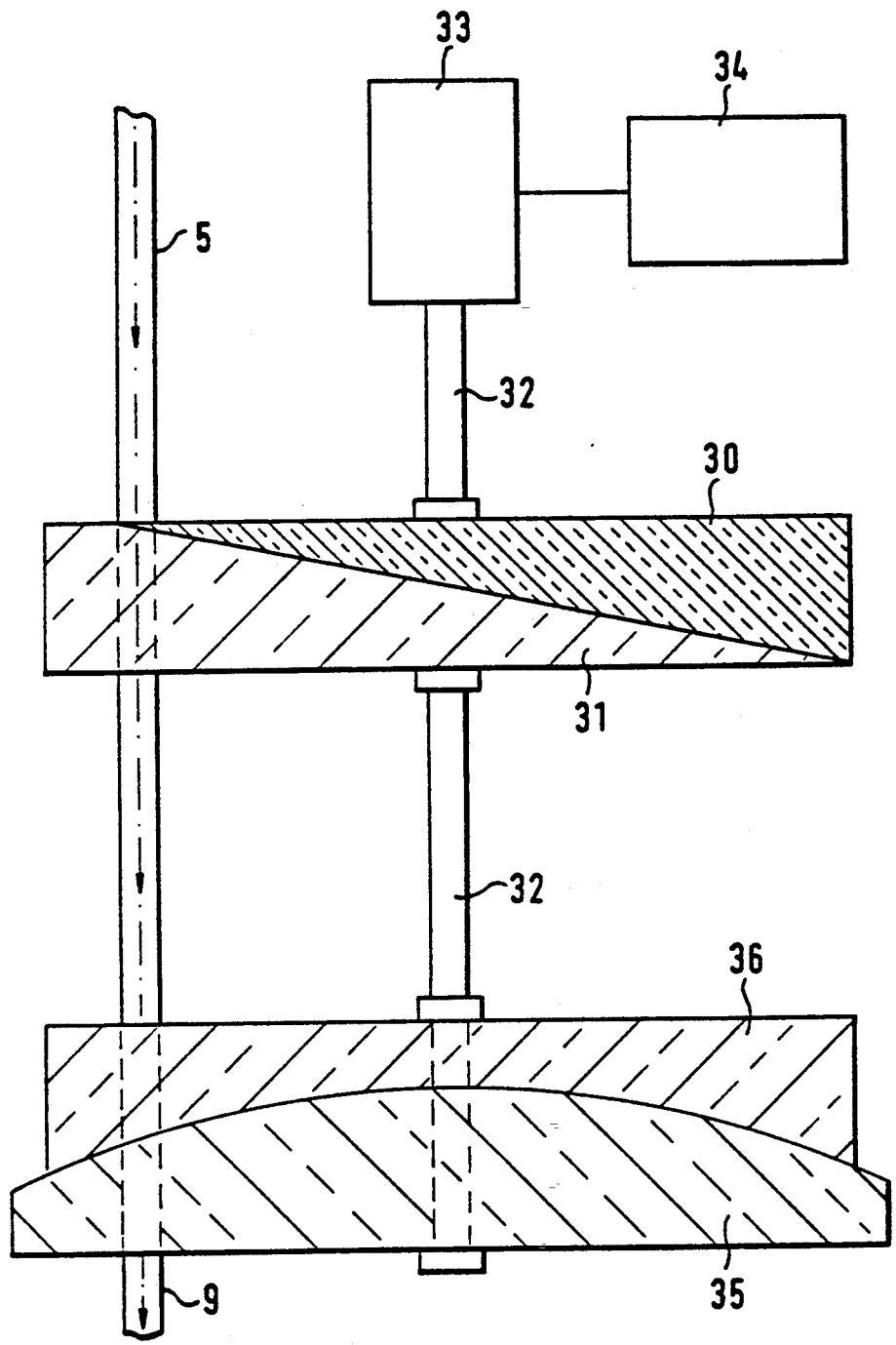
FIG. 3 is a schematic diagram of a second embodiment of an attenuator of the invention.

Besides the provision of a retroreflective element, there are other possibilities to compensate any beam deviations due to refractive index steps. Such an alternative embodiment is shown in FIG. 3. According to this embodiment, there is provided an absorbing wedge 30 and a non-absorbing wedge 31 through which the light beam 5 to be attenuated passes. The wedges 30 and 31 are fixed to each other and can be rotated around an axis 32 by a motor 33 in response to control signals from a control circuitry 34. The compensating means in this embodiment comprises an arrangement of a plano-convex lens 35 and a plano-concave lens 36 which are also mounted to the axis 32. The lenses 35 and 36 are made of the same material as the non-absorbing wedge 31. The plano-convex lens 35 is adjusted such as to compensate for any deflections of the beam transmitted through the combined structure of the absorbing wedge 30 and the non-absorbing wedge 31 when the arrangement is rotated. The adjustment is performed such that the lens 35 is shifted along the surface which contacts the lens 36 so that the combined structure of lenses 35 and 36 has a wedge-shaped cross-section.

Although both embodiments described above have a non-absorbing wedge as a part of the compensating means, it is understood that there are alternative designs of the compensating means which do not require such a non-absorbing wedge. It would be possible, for example, to simply use a corner cube arranged behind the absorbing wedge as the compensating means. The beam impinging on the absorbing wedge and the beam transmitted through the wedge after being reflected by the corner cube are parallel to each other, i.e., have the same direction. There is, however, a lateral offset between these two beams which is larger than in the case where an additional non-absorbing wedge is used. Thus, in fiber optical applications, it is preferred to use such an additional wedge having the same or a similar index of refraction as the absorbing wedge.

What is claimed is:

1. An optical attenuator for attenuating the intensity of an incoming light beam to provide an attenuated outgoing light beam, comprising:
    a wedge-shaped attenuator disk made of an absorbing material through which the incoming light beam is transmitted,
    rotation means for rotating the attenuator disk around an axis such that the attenuation of the light beam transmitted through the disk is different for different angular positions ($\alpha$) of the disk, and
    compensating means for compensating for any beam deflections caused by refraction of the transmitted light beam so that the direction of the outgoing beam remains substantially constant when the attenuator disk is rotating around the axis.

2. Optical attenuator as in claim 1, wherein the compensating means comprise a substantially non-absorbing disk having substantially the same index of refraction as the attenuator disk.

3. Optical attenuator as in claim 2, wherein a front face of the attenuator disk onto which the incoming light beam impinges is inclined with respect to a rear face of the non-absorbing disk through which the attenuated light beam leaves the attenuator.

4. Optical attenuator as in claim 1, wherein the compensating means comprise a retroreflective element arranged in the beam path behind the attenuator disk which directs the beam transmitted through the attenuator disk back through the disk such that the outgoing beam is parallely displaced relative to the incoming beam.

5. Optical attenuator as in claim 2, additionally comprising a retroreflective element arranged in the beam path behind the attenuator disk which directs the beam transmitted through the attenuator disk back through the disk such that the outgoing beam is parallely displaced relative to the incoming beam.

6. Optical attenuator as in claim 4, wherein the retroreflective element is a corner cube prism comprising three mutually orthogonal totally reflecting prism planes.

7. Optical attenuator as in claim 5, wherein the retroreflective element is a corner cube prism comprising three mutually orthogonal totally reflecting prism planes.

8. Optical attenuator as in claim 4, further comprising a beam deviating element which causes a parallel displacement of the outgoing light beam.

9. Optical attenuator as in claim 5, further comprising a beam deviating element which causes a parallel displacement of the outgong light beam.

10. Optical attenuator as in claim 9, wherein the beam deviating element comprises a prism.

11. Optical attenuator as in claim 2, additionally comprising an arrangement of a plano-concave lens and a plano-convex lens through which the attenuated light beam is transmitted, wherein the relative position of the two lenses is adjustable for compensating beam deviations of the attenuated light beam.

12. Optical attenuator as in claim 1, wherein the front face onto which the incoming light beam impinges is inclined relative to the axis of the incoming light beam.

13. Optical attenuator as in claim 1, further comprising a memory containing data about the angular orientation ($\alpha$) of the attenuator disk corresponding to a desired attenuation.

14. A fiber optic system, comprising:
an optical attenuator attenuating an incoming light beam and an optical fiber coupled to said attenuator such that the attenuated light beam is coupled into said optical fiber, said optical attenuator comprising:
a wedge-shaped attenuator disk through which the incoming light beam is transmitted, said attenuator disk comprising an absorbing glass material;
rotation means for rotating the attenuator disk around an axis such that the attenuation of the light beam varies as the disk is rotated; and
compensating means for compensating for any beam deflections caused by refraction of the transmitted light beam so that the direction of an outgoing beam remains substantially constant when the attenuator disk is rotating around the axis.

15. Fiber optic system as in claim 14, further comprising compensating means for compensating for any beam deflections caused by refraction of the transmitted light beam so that the direction of an outgoing beam from the attenuator into the optical fiber remains substantially constant when the attenuator disk is rotating around the axis.

16. Fiber optic system as in claim 15, wherein the compensating means comprise a substantially non-absorbing disk having substantially the same index of refraction as the attenuator disk.

17. Fiber optic system as in claim 16, wherein a front face of the attenuator disk onto which the incoming light beam impinges is inclined with respect to a rear face of the non-absorbing disk through which the attenuated light beam leaves the attenuator.

18. Fiber optic system as in claim 17, additionally comprising a retroreflective element arranged in the beam path behind the attenuator disk which directs the beam transmitted through the attenuator disk back through the disk such that the outgoing beam is parallely displaced relative to the incoming beam.

19. Fiber optic system as in claim 18, wherein the retroreflective element is a corner cube prism comprising three mutually orthogonal totally reflecting prism planes.

20. Fiber optic system as in claim 19, further comprising a beam deviating prism element which causes a parallel displacement of the outgoing light beam.

* * * * *